United States Patent [19]

Calco

[11] Patent Number: 5,032,045

[45] Date of Patent: Jul. 16, 1991

[54] QUICK ACTION CLAMP

[75] Inventor: Frank S. Calco, Olmsted Falls, Ohio

[73] Assignee: The United States of America as represented by the Administrator of the National Aeronautics and Space Administration, Washington, D.C.

[21] Appl. No.: 503,418

[22] Filed: Mar. 30, 1990

[51] Int. Cl.$^5$ .......... B60P 7/15; E05C 5/04

[52] U.S. Cl. .......... 410/80; 410/84; 292/60; 292/61

[58] Field of Search .......... 410/77, 79, 82, 80, 410/84; 292/57, 60, 62, 61, 58

[56] References Cited

U.S. PATENT DOCUMENTS

| | | | |
|---|---|---|---|
| 254,232 | 2/1882 | Orton | 292/57 X |
| 282,826 | 8/1883 | Wilson | 410/84 |
| 449,916 | 4/1891 | Raisor | 292/60 |
| 489,535 | 1/1893 | Kitching | 292/60 |
| 504,262 | 8/1893 | Adams | 292/62 |
| 647,103 | 4/1900 | Mendel | 292/60 |
| 836,313 | 11/1906 | Fox | 292/57 |
| 863,479 | 8/1907 | Wilson | 292/60 |
| 2,249,294 | 7/1941 | Kohler | 292/60 X |
| 3,659,886 | 5/1972 | Andrews | 292/78 |
| 4,066,284 | 1/1978 | Ikemura | 292/62 |
| 4,218,081 | 8/1980 | Johnson | 292/66 |
| 4,420,905 | 12/1983 | Kucharczyk | 49/192 |
| 4,522,436 | 6/1985 | Hoen et al. | 292/113 |
| 4,682,745 | 7/1987 | Acres | 244/161 |
| 4,744,392 | 5/1988 | Tade, III et al. | 292/61 X |

FOREIGN PATENT DOCUMENTS

| | | | |
|---|---|---|---|
| 1494729 | 12/1977 | United Kingdom | 410/82 |

*Primary Examiner*—Frank E. Werner
*Assistant Examiner*—Scott L. Lowe
*Attorney, Agent, or Firm*—Gene E. Shook; John R. Manning; James A. Mackin

[57] ABSTRACT

A quick release toggle clamp utilizes a spring that requires a deliberate positive action for disengagement. The clamp has a sliding bolt that provides a latching mechanism. The bolt is moved by a handle that tends to remain in an engaged position while under tension.

15 Claims, 3 Drawing Sheets

QUICK ACTION CLAMP

ORIGIN OF THE INVENTION

The invention described herein was made by an employee of the United States Government and may be manufactured or used by or for the Government without the payment of any royalties thereon or therefor.

1. Technical Field

This invention is concerned with a clamping device which positively locks in a clamped position. The invention is particularly directed to a quick action clamp which utilizes a positive locking bolt to firmly secure an object in a predetermined position. The quick action clamp is useful in securing experimental packages during flight prior to a free fall when the package is released.

Various types of commercial toggle clamps of the bolt-down type have been proposed. Such clamping units rely on toggle latches which can accidentally move to the release position. Another problem encountered with these commercial devices is that they become unlocked during excessive vibration. Also, these devices snap out of the locking position in shock loading by accidental contact with the toggle locking handle.

It is, therefor, an object of the present invention to provide a quick action bolt locking device which has a positive locking action to firmly secure an object in a predetermined position.

Another object of the invention is to provide a quick action clamp which will not snap out of a locking position under shock loading conditions.

2. Background Art

U.S. Pat. No. 3,659,886 discloses a toggle latch designed for aircraft use. A spring is relied on to firmly secure the latch mechanism.

U.S. Pat. No. 4,218,081 describes a latch having a multiple function prevailing-torque mechanism which facilitates engagement and disengagement of a draw bolt and strike. The device further utilizes a secondary latch to secure the primary latch in the closed position.

U.S. Pat. No. 4,420,905 illustrates a latching mechanism for a window or door closure hingedly mounted on a fixed frame. The latch incorporates a controlled cam and catch fixed to the hinged side of the frame.

U.S. Pat. No. 4,522,436 discloses a spring-loaded toggle clamp to removably secure two panels. The latch comprises a bracket, a handle, and a draw bar that are solely joined by coiled tensioned springs which load the draw bar.

U.S. Pat. No. 4,682,745 relates to a preloadable vector-sensitive latch which automatically releases when the force vector from a latch member reaches a specific release angle. The latch also contains means to remove clearance between the latched members and to preload the latch to prevent separation of angles less than the specified release angle.

DISCLOSURE OF THE INVENTION

This quick release toggle clamp is easy to use. The clamp cannot be disengaged by excessive vibration, and it utilizes a spring that requires a deliberate positive action for disengagement.

The clamp utilizes a sliding bolt that provides a latching mechanism. The bolt is moved by a handle that tends to remain in an engaged position while under tension.

BRIEF DESCRIPTION OF THE DRAWINGS

The advantages and novel features of the invention will be more fully apparent from the following detailed description when read in connection with the accompanying drawings wherein.

BEST MODE FOR CARRYING OUT THE INVENTION

Figure 1:
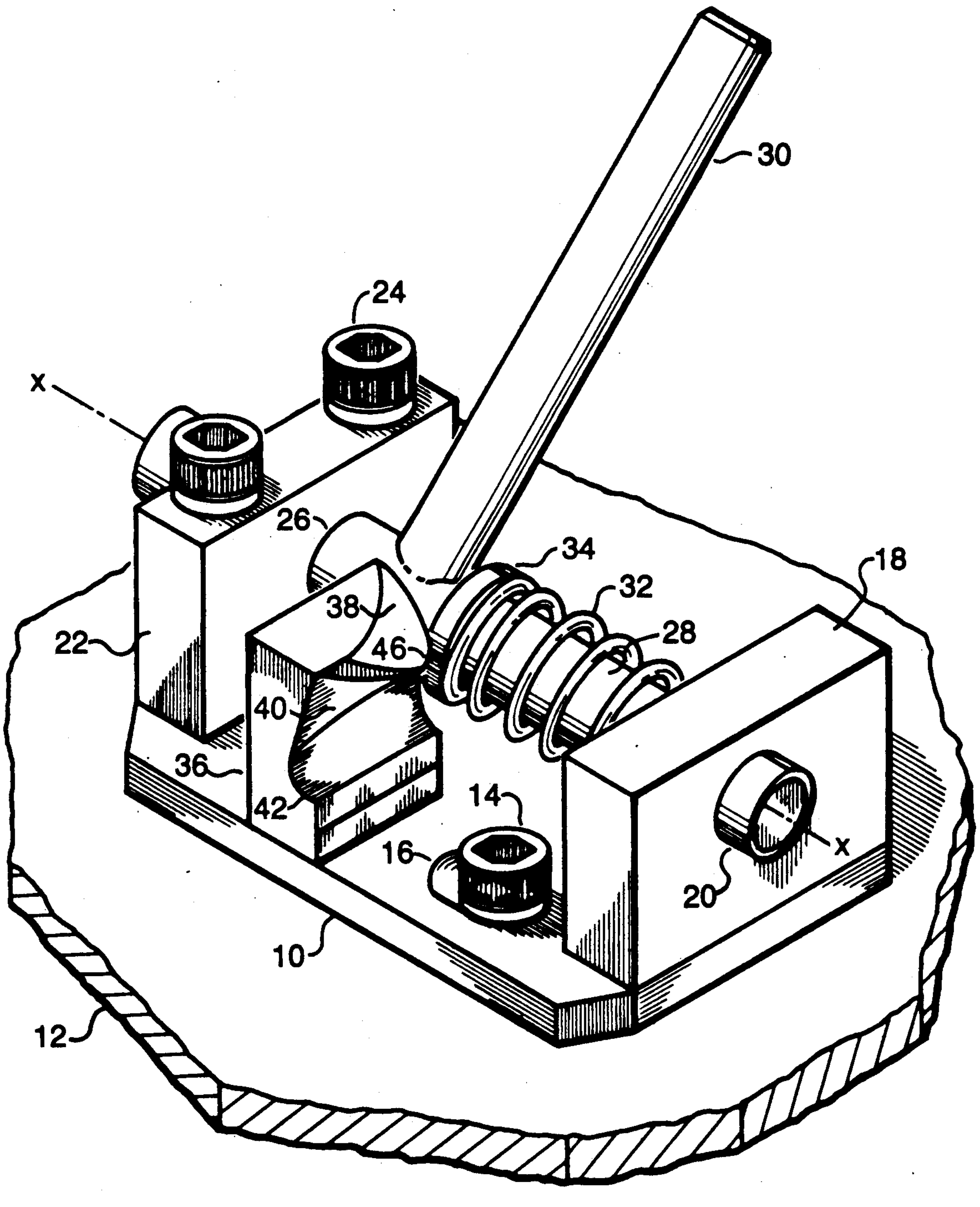
FIG. 1 is a perspective view of a quick action clamp constructed in accordance with the present invention that is shown in the open or release position.
Figure 2:
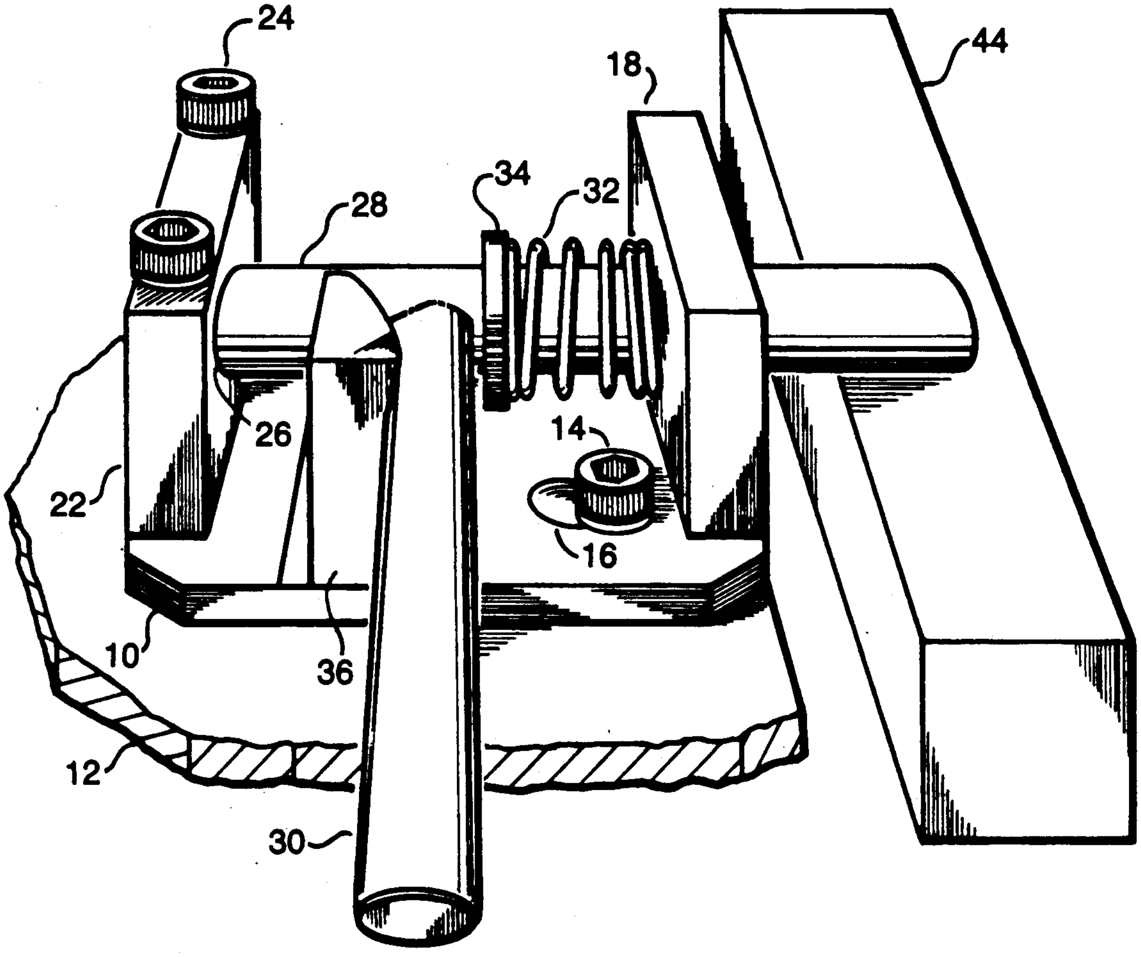
FIG. 2 is a perspective view of the quick action clamp shown in the closed or locked position.
Figure 3:
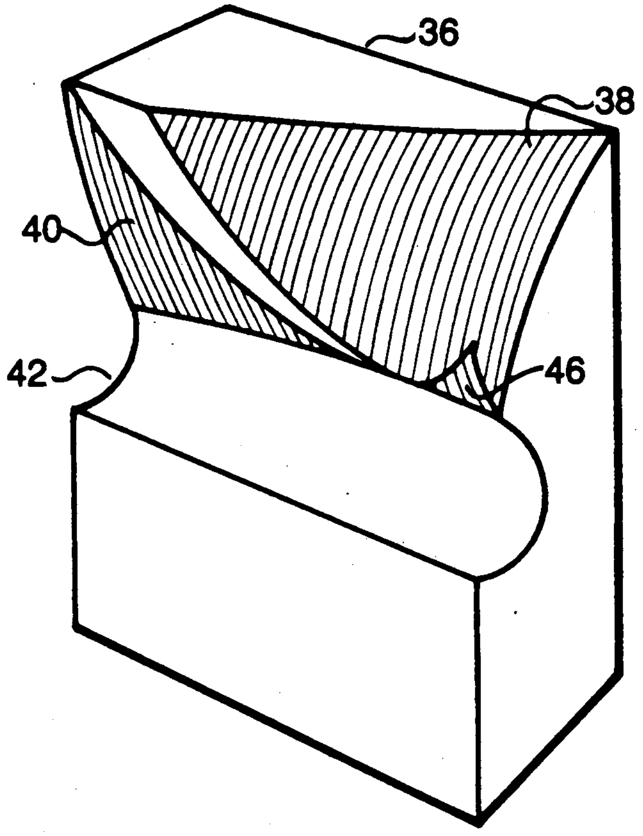
FIG. 3 is a perspective view showing the cam surfaces on the locking block of the quick action clamp.

Referring now to the drawings, there is shown in FIGS. 1 and 2 quick action claims constructed in accordance with the present invention. The device utilizes a base 10 that is secured to a suitable support 12, such as the cargo floor of an aircraft, by suitable bolts 14 in slots 16.

A mounting block 18 is rigidly secured to the upwardly facing surface of the base 10 by welding or the like. This block is adjacent to the edge of the base 10 nearest the experimental package or the like which is to be secured in a predetermined position. A centrally disposed bore 20 extends through the block 18 as shown in FIG. 1.

An assembly block 22 is removably secured to the upwardly facing surface of the base 10 by a pair of bolts 24. This block is adjacent to the opposite edge of the base remote from the secured package. A centrally disposed bore 26 extends through the block 22, as shown in FIGS. 1 and 2.

A solid cylindrical shaft forms a locking bolt 28 which extends through the blocks 18 and 22. This bolt is free to slide along its longitudinal axis x-x in the bores 20 and 26. A suitable handle 30 is provided on the bolt 28 to facilitate this sliding motion toward and away from the experimental package. The bolt 28 is also selectively rotatable about its longitudinal axis x-x by the handle 30.

The clamp is assembled by first removing the assembly block 22 from the base 10. The bolt 28 is inserted into a compression spring 32. The end of the bolt adjacent to the spring 32 is then inserted into the bore 20 of the fixed mounting block 18.

The end of the bolt 28 remote from the spring 32 and on the opposite side of the handle 30 is then inserted into the bore 26 of the block 22. The bolts 24 are inserted into suitable holes in the assembly block 22 for securing this block onto the base 10, as shown in FIG. 1.

The bolt 28 is maintained in the open or release position shown in FIG. 1 by the compression spring 32 which engages the block 18 and a rigid collar 34 on the bolt 28. The bolt 28 remains in the open position shown in FIG. 1 until it is deliberately moved by the handle 30.

An important feature of the invention is the provision of a cam block 36 that is rigidly mounted on the base 10. The cam block 36 has a first cam surface 38 for moving the bolt into a closed or locked position shown in FIG. 2. This cam surface 38 is adjacent the top of the cam block 36 and faces the mounting block 18.

A second cam surface 40 is formed on a cam block 36 adjacent to the first cam surface 38. This cam surface 40 is used to assist in moving the bolt 28 from the closed or locked position shown in FIG. 2 to the open or release position shown in FIG. 1.

In operation, the handle 30 is rotated toward the cam block 36 into engagement with the cam surface 38 to aid in sliding the bolt 28 longitudinally along the axis x-x against the force of compression spring 32. Upon reaching the lowermost edge of the cam surface 38 the handle 30 has moved the bolt to the closed or locked position shown in FIG. 2, and the handle slides into a suitable slot 42 in the cam block 36. This slot 42 is substantially at right angles to the axis x-x and serves to maintain the bolt 28 in the closed or locked position shown in FIG. 2.

In the closed or locked position the bolt 28 is in contact with a suitable bar 44 on the package which is to be positioned. Prior to clamping, the bar 44 is placed on the surface of the cargo floor 12 and the bolt is moved into engagement with the opposite side of the bar, as shown in FIG. 2. The force exerted by compression spring 32 against the collar 34 maintains the handle 30 in the slot 42 until it is deliberately moved.

When it is desired to move the bolt 28 from the closed or locked position shown in FIG. 2 back to the open or release position shown in FIG. 1, handle 30 is lifted into engagement with the second cam surface 40 as well as a third cam surface 46 which is adjacent to the first cam surface 38. This moves the handle out of the slot 42 to a point where the handle is moved toward the assembly block 22 by the force of the spring 32. The third cam surface 46 provides clearance for the handle 30 to move smoothly from the second cam surface 40 to the open or release position.

It will be appreciated that the compression spring 32 absorbs shock and vibration loads. Also, the spring 32 expands to positively lock the handle in the detent or slot 42 thereby positively maintaining the bolt in the closed or locked position.

The cam surfaces 38 and 40 employ compound curves to facilitate quick lock/unlock operation. The combination of the two cam surfaces 38 and 40 adjacent to the detent or slot 42 prevents accidental unlocking of the system due to shock, vibration and loading. It is evident that the handle 30 must be positively actuated to move the bolt 28 from the closed or locked position to the open or release position. In addition to ease of assembly, the device has the advantage in that inclement weather will not affect its operation.

While the preferred embodiment of the invention has been shown and described, it will be appreciated that various structural modifications may be made to the invention without departing from the spirit thereof or the scope of the subjoined claims. By way of example it is contemplated that the clamp may be electrically actuated with a solenoid together with gears and levers.

I claim:

1. A quick action clamp for maintaining a body in a predetermined position comprising
- support means,
- a bolt member mounted for reciprocable movement on said support means from a body engaging position to a release position,
- biasing means for moving said bolt member to said release position,
- a handle rigidly mounted on said bolt member for moving the same in opposition to said biasing means to said body engaging position,
- a first cam surface having a compound curve on said support means for engaging said handle to aid the same in its movement to said engaging position,
- a second cam surface having a compound curve on said support member for engaging said handle to aid the same in its movement to said release position, and
- means on said support member for engaging said handle to aid the same in its movement between said first and second curved cam surfaces.

2. A clamp as claimed in claim 1 wherein the support means comprises a base member having a cam block thereon for engaging said handle.

3. A clamp as claimed in claim 2 wherein the cam block has the first and second cam surfaces formed thereon.

4. A clamp as claimed in claim 3 wherein the cam block has a slot formed therein adjacent said second cam surface for positioning said handle in the body engaging position.

5. A clamp as claimed in claim 4 wherein the biasing means retains the handle in said slot.

6. A clamp as claimed in claim 5 wherein the biasing means comprises a compression spring surrounding said bolt member.

7. A clamp as claimed in claim 6 including a collar on said bolt member for engaging one end of said spring.

8. A clamp as claimed in claim 2 including
- a mounting block rigidly mounted on said base member adjacent to said body, for slidably supporting one end of said bolt member, and
- an assembly block removably mounted on said base member remote from said body, for slidably supporting the other end of said bolt member.

9. A clamp as claimed in claim 8 wherein the biasing means comprises a compression spring carried by said bolt member with one end in engagement with the mounting block.

10. A clamp as claimed in claim 9 including a collar on the bolt for engaging the other end of the compression spring.

11. In a quick action clamp of the type wherein a reciprocably mounted bolt is moved from a closed position to an open position by a handle thereon, the improvement comprising
- a member having a slot therein for engaging said handle when the bolt is in the closed position,
- biasing means for providing a force to maintain said handle in engagement with said slot, and
- a plurality of compound curved cam surfaces on said member for aiding the reciprocating movement of said handle against said force including a cam surface between two of said compound curved cam surfaces to provide clearance for said handle to move smoothly between said two compound curved cam surfaces.

12. A quick action clamp as claimed in claim 11 including one of said cam surfaces being adjacent to said slot for engaging the handle to aid the same into engagement with said slot.

13. A quick action clamp as claimed in claim 12 including another of said cam surfaces being on said member for engaging the handle to aid the same into engagement with said slot.

14. In a quick action clamp of the type wherein a reciprocably mounted bolt is moved from a closed position to an open position by a handle thereon, the improvement comprising a member having a slot therein for engaging said handle when the bolt is in the closed position, biasing means for maintaining said handle in engagement with said slot, and a plurality of cam surfaces on said member for aiding the reciprocating movement of said handle, said cam surfaces including one cam surface adjacent to said slot for engaging the handle to aid the same in moving out of engagement with said slot, another cam surface for engaging the handle to aid the same in moving into engagement with said slot, and a third cam surface between said one cam surface and said other cam surface to provide clearance for said handle to move smoothly between said one cam surface and said other cam surface.

15. A quick action clamp as claimed in claim 11 including a compression spring mounted on said bolt for maintaining the handle in engagement with said slot.

* * * * *